US012544791B2

(12) United States Patent
Beattie et al.

(10) Patent No.: US 12,544,791 B2
(45) Date of Patent: Feb. 10, 2026

(54) SPLIT-DECK SCREENING DEVICE FOR SCREENING BULK MATERIAL

(71) Applicant: SANDVIK LTD, Dungannon (GB)

(72) Inventors: Stephen Beattie, Dungannon (GB); Stephen Kelly, Dungannon (GB)

(73) Assignee: SANDVIK LTD, Dungannon (GB)

(*) Notice: Subject to any disclaimer, the term of this patent is extended or adjusted under 35 U.S.C. 154(b) by 97 days.

(21) Appl. No.: 18/562,889

(22) PCT Filed: May 10, 2022

(86) PCT No.: PCT/EP2022/062547
§ 371 (c)(1),
(2) Date: Nov. 21, 2023

(87) PCT Pub. No.: WO2022/248206
PCT Pub. Date: Dec. 1, 2022

(65) Prior Publication Data

US 2024/0216955 A1 Jul. 4, 2024

(30) Foreign Application Priority Data

May 27, 2021 (EP) .................................... 21176244

(51) Int. Cl.
*B07B 1/46* (2006.01)
*B07B 1/00* (2006.01)
*B07B 1/28* (2006.01)

(52) U.S. Cl.
CPC ................ *B07B 1/46* (2013.01); *B07B 1/005* (2013.01); *B07B 1/28* (2013.01); *B07B 2201/04* (2013.01)

(58) Field of Classification Search
CPC .......... B07B 1/28; B07B 1/46; B07B 2201/04
USPC ........................................ 209/348, 392, 413
See application file for complete search history.

(56) References Cited

U.S. PATENT DOCUMENTS 2,058,959 A 10/1936 Denning
4,063,375 A * 12/1977 Satterwhite ............ E02F 3/248 198/581
9,808,834 B2 * 11/2017 Andersen ............... B07B 1/005

FOREIGN PATENT DOCUMENTS

EP 1066121 A1 1/2001
EP 2907589 A1 8/2015

* cited by examiner

*Primary Examiner* — Molly K Devine
(74) *Attorney, Agent, or Firm* — Corinne R. Gorski

(57) ABSTRACT

A split-deck screening device for screening bulk material includes a main sub-frame, a primary screen box including a plurality of screening decks having a loading end to receive bulk material and an opposite discharge end to discharge non-screened material, a secondary screen box mounted to the main sub-frame including a plurality of screening decks having a loading end adjacent to the discharge end of the primary screen box and a discharge end to discharge unscreened material. A sub-frame carriage couples a primary screen box sub-frame to the main sub-frame and moves the primary screen box from an operative position wherein the discharge end of the primary screen box is adjacent to a loading end of the secondary screen box to an inoperative position wherein the primary screen box is spaced above and from the secondary screen box to provide access to any lower screening decks of the secondary screen box.

11 Claims, 12 Drawing Sheets

SPLIT-DECK SCREENING DEVICE FOR SCREENING BULK MATERIAL

RELATED APPLICATION DATA

This application is a § 371 National Stage Application of PCT International Application No. PCT/EP2022/062547 filed May 10, 2022 with priority to EP 21176244.8 filed May 27 2021.

FIELD OF THE INVENTION

The present invention relates to a a split-deck screening device for screening bulk material. Also described is a screening plant assembly in a static or mobile form that includes a split-deck.

BACKGROUND TO THE INVENTION

Various types of screening devices for bulk material have been developed for screening or sorting bulk materials such as quarry stone, site clearance materials, domestic and industrial waste. They generally include a screening deck with holes defining a mesh size and a vibrational apparatus to vibrate the deck to screen the material delivered on to the deck, and an arrangement of conveyors to collect screened material that has passed through the deck and unscreened material that has not passed through the deck. Often the device will include more than one screening deck arranged in a stacked arrangement, with each deck having a different mesh size, and an arrangement of conveyors to collect material from the respective decks are deliver the screened materials to different stockpiles. Generally, the screening deck(s) are mounted in a screen box configured to vibrate to assist with screening of the material and to move the material along the deck from a loading end to a discharge end. The deck may be inclined downwardly from a loading end to a discharge end to vary the residence time of the bulk material on the deck. For example, loose and easily separated bulk material requires a shorted residence time on the deck allowing the deck to tilted to increase the speed on movement of the material along the deck, whereas wet material require a longer time on the deck and may therefore be screened on a horizontal or near-horizontal deck.

In some devices, the screening deck(s) are split and provided as a primary screen box containing one or more decks and a secondary screen box containing one or more decks, with a discharge end of the primary screen box adjacent to the loading end of the secondary screen box allowing the discharge ends of the deck or decks in the primary screen box delivery material on to a loading end of the corresponding decks in the secondary screen box. The splitting of the decks allows the angle of screening to be varied along the deck, and also allows the individual screen boxes to be operated higher speeds and amplitudes which equates to better performance.

FIG. 1 (prior art) shows a known split-deck screening device (A) having two decks for screening bulk material comprising a main sub-frame (B) mountable on a main frame (not shown), a primary screen box (C) comprising a plurality of vertically stacked screening decks (not shown) having a loading end (D1) to receive a supply of bulk material and an opposite discharge end (E1) to discharge non-screened material, a secondary screen box (F) mounted to the main sub-frame comprising a plurality of screening decks (not shown) having a loading end (D2) adjacent to the discharge end (E1) of the primary screen box and an opposite discharge end (E2) to discharge unscreened material, a primary screen box sub-frame (F) coupled to the main sub-frame having a discharge end (G) and a loading end (H), and a tilting mechanism (I) to tilt the primary screen box sub-frame relative to the main sub-frame downwardly towards the secondary screen box. A problem with this type of split-deck multi-deck device is that the primary and secondary screen boxes are mounted to the main sub-frame in a fixed position. Thus, if one of the lower decks of the secondary screen box requires maintenance (which is a common occurrence for screening decks used to screen quarry bulk materials), it is necessary to remove the upper deck or decks in order to gain access to the lower deck, which is a difficult and time-consuming operation. This problem is compounded by the fact that screening plant machines are often located in remote locations and have to be maintained on site which involves bringing specialist lifting equipment to the machines themselves as opposed to bringing the machine to a repair location.

It is an objective of the invention to overcome at least one of the above-referenced problems.

SUMMARY OF THE INVENTION

The objective is met by the provision of a split-deck screening device, in which the device includes a sub-frame carriage to which the primary box sub-frame is attached and in which the sub-frame carriage is mounted to the main sub-frame and actable to move the primary box sub-frame up and away from the secondary screen box. This results in the primary screen box (and associated sub-frame) being moved from an operative position (shown in FIG. 2 or FIG. 4 (tilted) to an inoperative position that is spaced laterally and vertically from the secondary box as shown in FIGS. 6 and 7. This movement of the primary screen box up and away from the secondary screen box permits access to the front end of the secondary screen box allowing maintenance to be performed, including removal of one or more of the lower decks in the secondary screen box as illustrated in FIG. 13.

In a first aspect, the invention provides a split-deck screening device for screening bulk material comprising:

- a main sub-frame mountable on a main frame;
- a primary screen box comprising a plurality of screening decks having a loading end to receive a supply of bulk material and an opposite discharge end to discharge non-screened material;
- a secondary screen box mounted to the main sub-frame comprising a plurality of screening decks having a loading end adjacent to the discharge end of the primary screen box and an opposite discharge end to discharge unscreened material;
- a primary screen box sub-frame coupled to the main sub-frame having a discharge end and a loading end, and
- optionally, a tilting mechanism to tilt the primary screen box sub-frame relative to the main sub-frame downwardly towards the secondary screen box, characterized in that the split-deck screening device comprises:
- a sub-frame carriage for coupling the primary screen box sub-frame to the main sub-frame (generally attached at each side of the discharge end of the primary screen box sub-frame) and actuable to move the primary screen box from an operative position in which the discharge end of the primary screen box is disposed adjacent to a receiving end of the secondary screen box to an inoperative position in which the primary screen box is laterally and vertically spaced from the secondary screen box to thereby provide access to one or more lower screening decks in the secondary screen box; and a first actuator to actuate the sub-frame carriage.

The device of the invention allows an efficient separation of the primary and secondary screen boxes to allow access to a rear end of the secondary screen box (and the lower decks contained in the box).

In any embodiment, the sub-frame carriage is slidably mounted to the main sub-frame for movement (typically angled movement) from the operative position to the inoperative position.

In any embodiment, the first actuator is coupled between the main sub-frame and each sub-frame carriage and operable to move the sub-frame carriages between the operative position and the inoperative position.

The use of a slidable sub-frame carriage allows controlled movement of the sub-frame carriage which is guided by the sliding relationship between the sub-frame carriage and the main sub-frame and driven by the actuator.

In other embodiments, the sub-frame carriage may be pivotally or hingedly mounted to the main sub-frame or coupled thereto by means of linkages.

In any embodiment, each sub-frame carriage is pivotally attached to the primary screen box sub-frame, and the device typically comprises a second actuator coupled between each sub-frame carriage and the primary screen box sub-frame and operable to tilt the primary screen box sub-frame relative to the sub-frame carriage.

In any embodiment, each of the primary and secondary screen boxes comprise at least two screening decks.

In any embodiment, each of the primary and secondary screen boxes comprise at least three or four screening decks.

In any embodiment, each sub-frame carriage comprises a supporting leg and an upper section disposed on top of the supporting leg, in which the main sub-frame comprises guide sections (generally disposed on each side of a discharge end of the main sub-frame) configured to receive each supporting leg in a sliding manner and guide the sliding movement of the sub-frame carriage between the operative and inoperative positions.

In any embodiment, the supporting leg has a rectangular profile.

In any embodiment, the guide section of the main sub-frame has a rectangular profile configured to receive the supporting leg.

In any embodiment, the guide section is dimensioned to receive the supporting leg in a tight but sliding relationship.

In any embodiment, each guide section of the main sub-frame defines a linear sliding path for the sub-frame carriage which is disposed at an angle Ø of about 30° to about 60° to a longitudinal axis of the main sub-frame.

In any embodiment, each guide section of the main sub-frame defines a linear sliding path for the sub-frame carriage which is disposed at an angle Ø of about 35° to about 55° to a longitudinal axis of the main sub-frame.

In any embodiment, each guide section of the main sub-frame defines a linear sliding path for the sub-frame carriage which is disposed at an angle Ø of about 40° to about 50° to a longitudinal axis of the main sub-frame.

In any embodiment, the upper section of each sub-frame carriage has a front section disposed above the supporting leg and a rear section, in which the front section is pivotally attached to the discharge end of the primary screen box sub-frame, and the rear section is attached to one end of each of the first and second actuators.

In any embodiment, the upper section of each sub-frame carriage comprises two spaced-apart upwardly depending plates, and in which the discharge end of the primary screen box sub-frame is pivotally mounted to the upper section between the plates.

In any embodiment, the main sub-frame comprises a guide for the primary screen box sub-frame disposed on each side of the primary screen box.

In any embodiment, the guide comprises two spaced apart plates configured to receive and guide a section of the primary screen box sub-frame during movement between the operative and inoperative positions.

In any embodiment, the guide comprises supporting means for supporting the primary box sub-frame in at least one position.

In any embodiment, the spaced apart plates comprise a series of holes for receipt of a locking pin to lock the primary screen box sub-frame in one of a plurality of positions above the main sub-frame.

In any embodiment, the secondary screen box is adjustably movable towards the primary screen box when the primary screen box is in the inoperative position.

In any embodiment, the secondary screen box comprises a length adjustable torque element configured for mounting between the secondary screen box and main sub-frame and actuable to move the secondary screen box towards the primary screen box.

In any embodiment, the device comprises at least two length adjustable torque element, configured for mounting to opposed sidewalls of the secondary screen box.

In any embodiment, the first and second actuating means are each, independently, hydraulic or pneumatic rams or electrical actuators.

In another aspect, there is provided a screening plant assembly comprising a main frame, and a split deck screening device according to the inventio, mounted to the main frame.

The screening plant assembly may be a static screening plant assembly or a mobile screening plant assembly.

In any embodiment, the screening device or screening plant assembly comprises separate discharge conveyors arranged to discharge, to separate stockpiles, screened material in different size ranges.

In another aspect, the invention provides a method of maintaining a split-deck screening device, comprising the steps of actuating the first actuator to move the sub-frame carriage to the inoperative position in which the primary screen box is spaced above and away from the secondary screen box to thereby provide access to one or more lower screening decks in the secondary screen box; and accessing a rear of the secondary screen box or a front of the primary screen box to perform maintenance.

In any embodiment, the step of maintaining comprises removing one or more of the lower screening decks of the secondary screen box without having to remove an upper screening deck of the secondary screen box.

In any embodiment, the split-deck screening device is a mobile or static split-screen screening device.

In any embodiment, the maintenance is performed in the field, for example at a quarry.

Other aspects and preferred embodiments of the invention are defined and described in the other claims set out below.

DETAILED DESCRIPTION OF THE INVENTION

All publications, patents, patent applications and other references mentioned herein are hereby incorporated by reference in their entireties for all purposes as if each individual publication, patent or patent application were specifically and individually indicated to be incorporated by reference and the content thereof recited in full.

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

Figure 2:
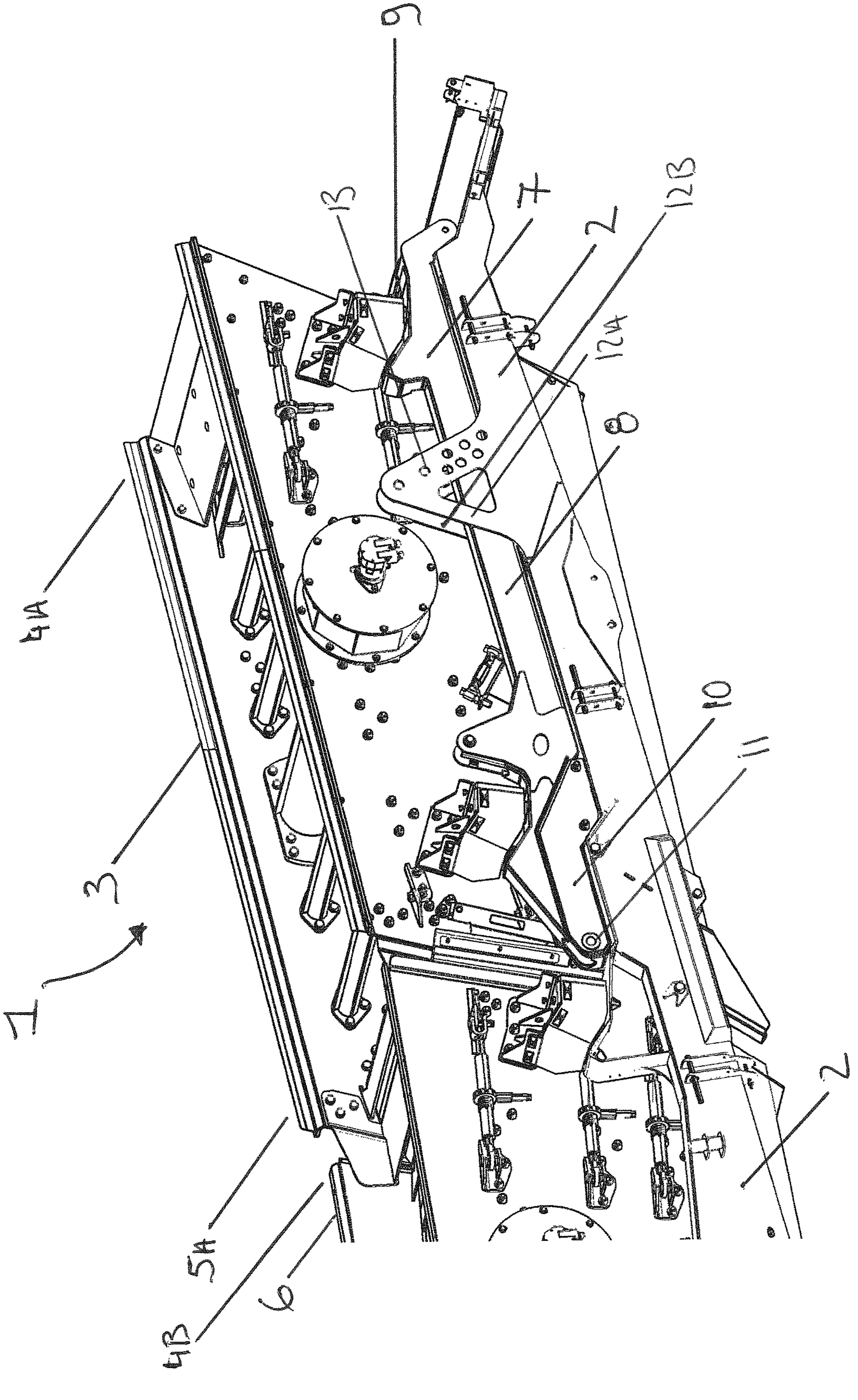
FIG. 2 is a perspective view from the side of a split-deck screening device according to the invention shown in an operative position.
Figure 3:
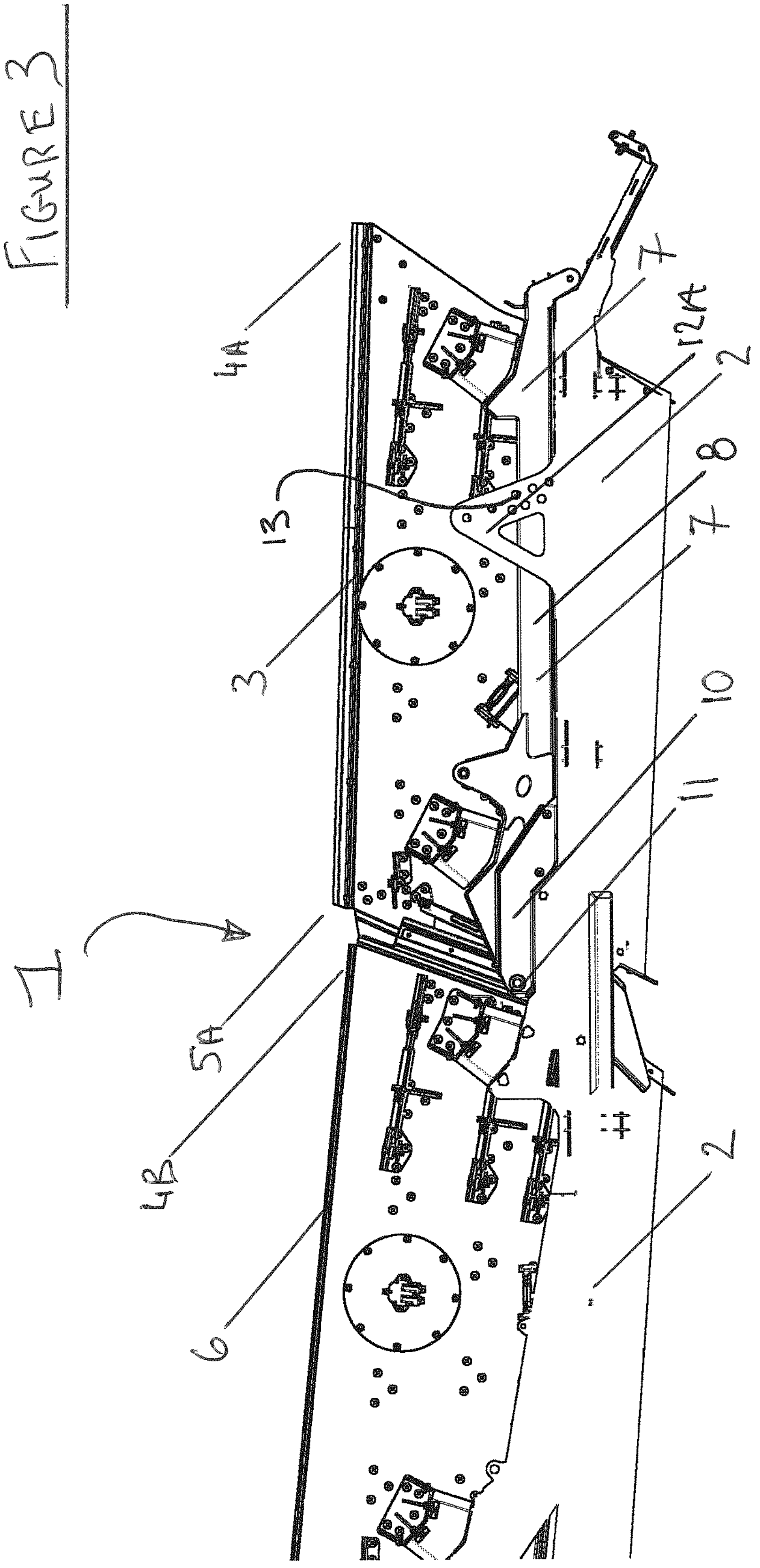
FIG. 3 is a side elevational view of the split-deck screening device of FIG. 2 in an operative position.
Figure 4:
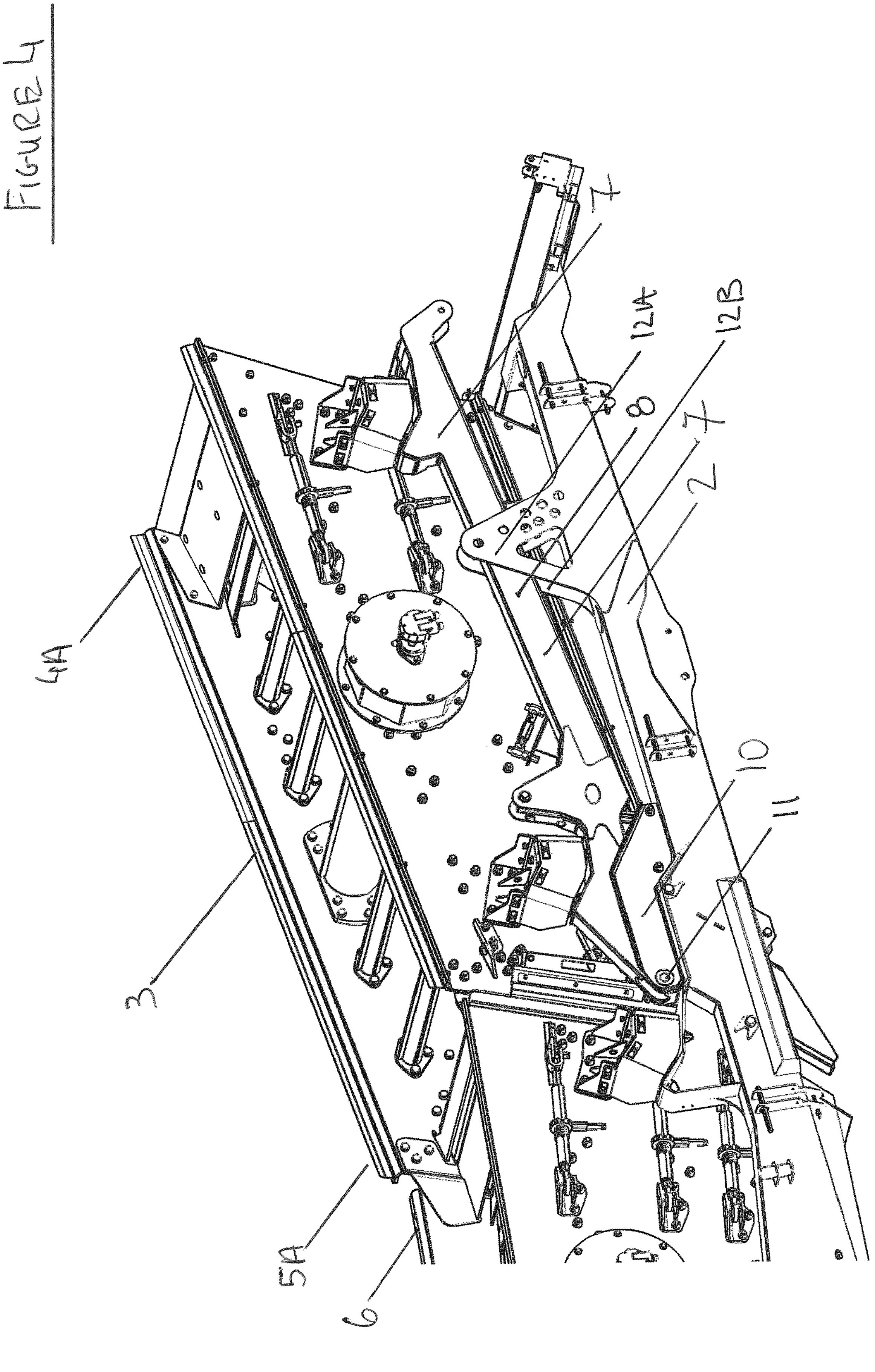
FIG. 4 is a perspective view from the side of the split-deck screening device of FIG. 1 showing the primary screen box and primary screen box sub-frame in an operative and tilted position.
Figure 5:
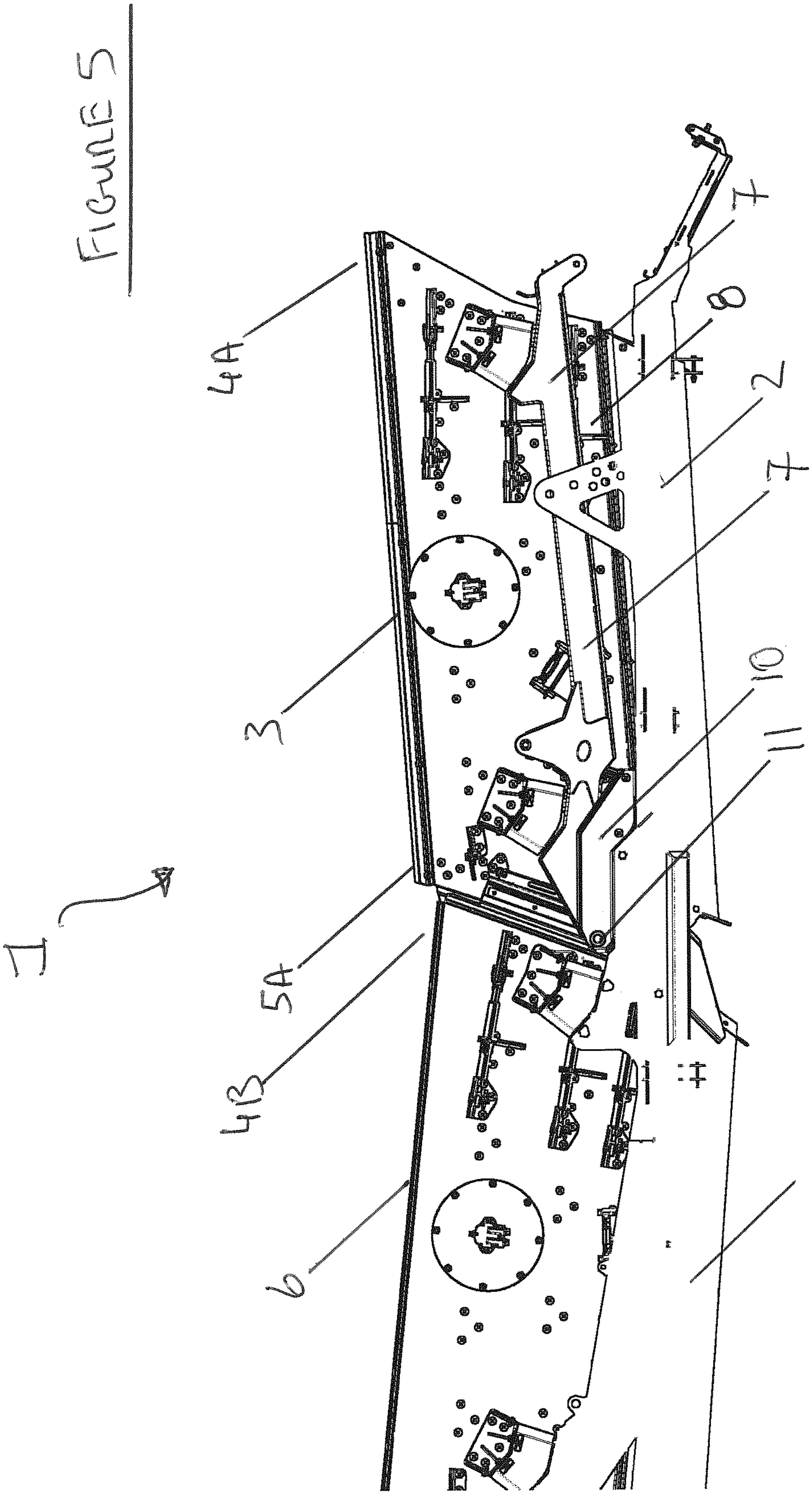
FIG. 5 is a side elevational view of the split-deck screening device in the operative and tilted position shown in FIG. 4.
Figure 6:
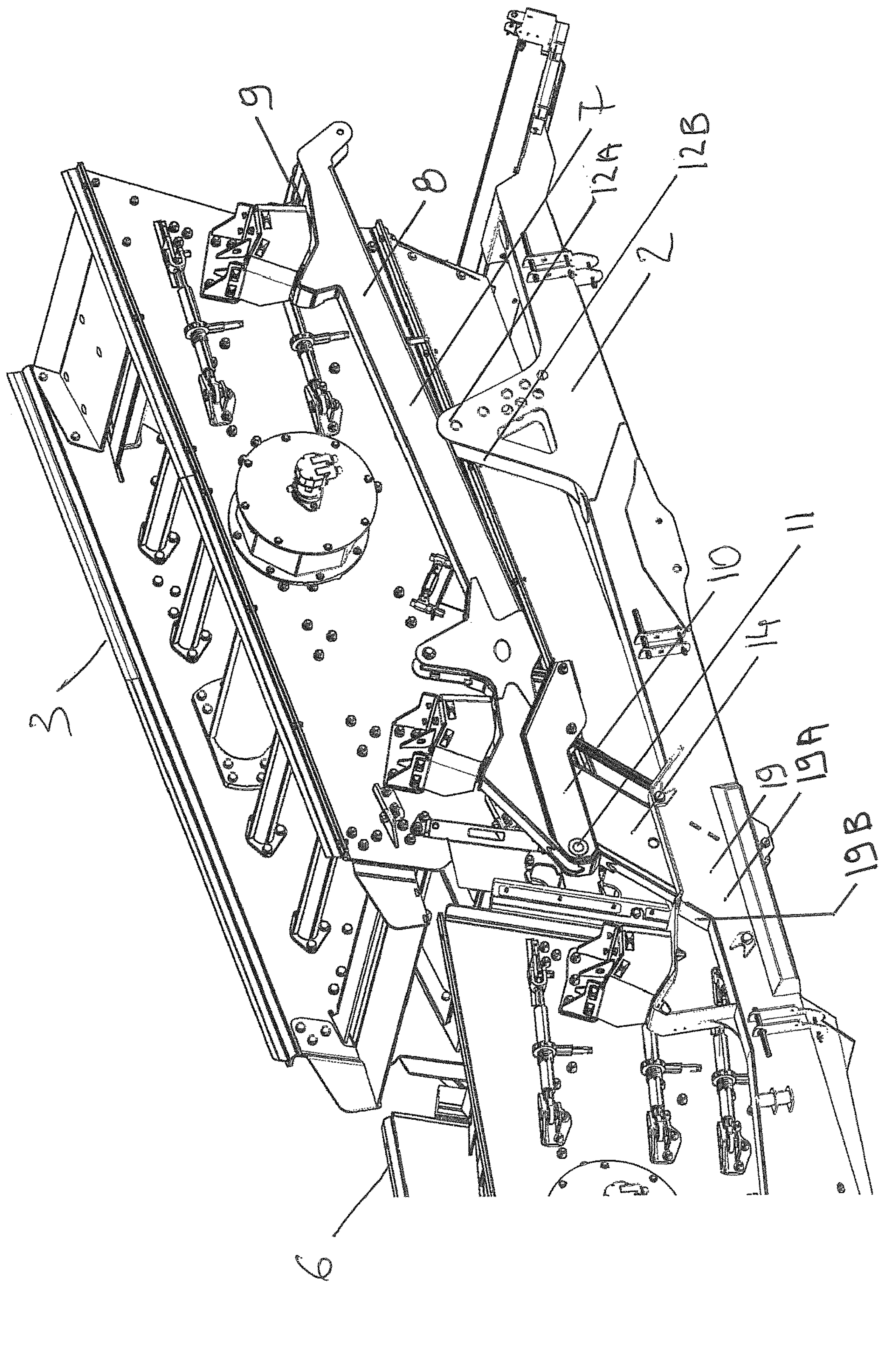
FIG. 6 is a perspective view from the side of the split-deck screening device of FIG. 1 in an inoperative position showing the primary screen box and primary screen box sub-frame laterally and vertically spaced from the secondary screen box.
Figure 7:
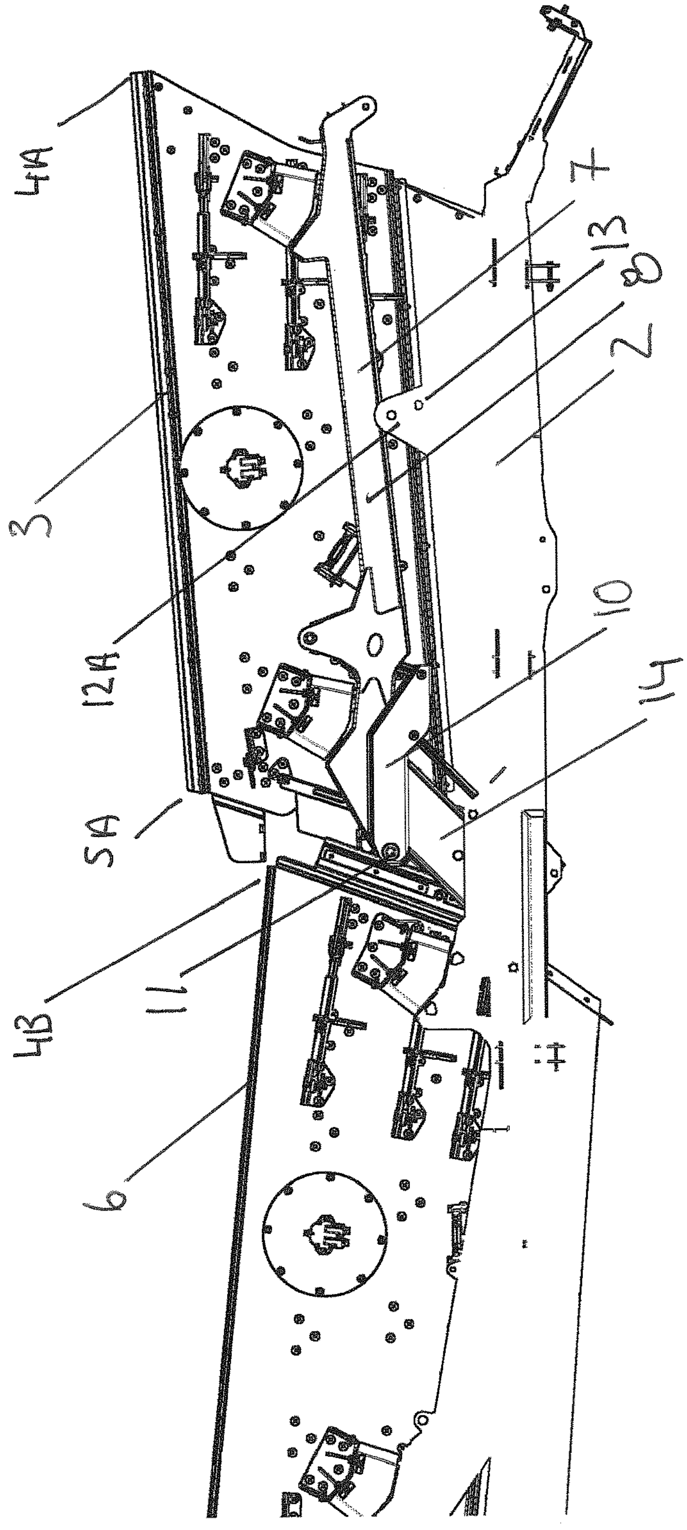
FIG. 7 is a side elevational view of the split-deck screening device in the inoperative and raised position shown in FIG. 6.

As used herein, the phrase "the primary screen box is laterally and vertically spaced from the secondary screen box" means that the primary screen box is moved up and away from the secondary screen box from an operative position to an inoperative position that allows access to the front of the secondary screen box. Generally, there is no movement of the secondary screen box in the Z-plane. This results in the primary screen box (and associated sub-frame) being moved from an operative position (shown in FIG. 2 or FIG. 4 (tilted) to an inoperative position that is spaced laterally and vertically from the secondary box as shown in FIGS. 6 and 7.

Exemplification

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

Figure 1:
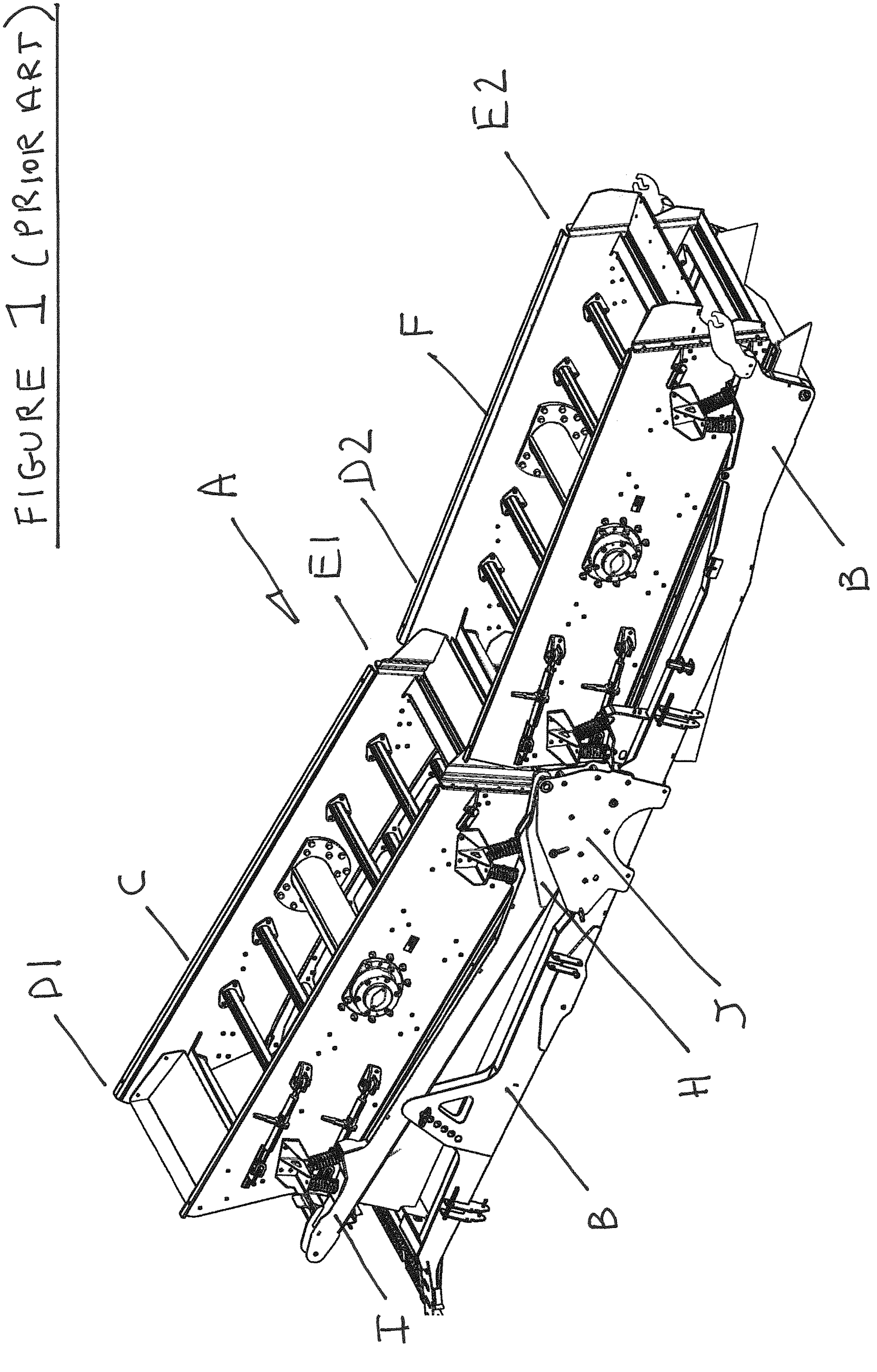
FIGURE 1 (PRIOR ART)
FIG. 1 (prior art) illustrates a split-deck screening device for screening bulk material having two decks and incorporating a tilting mechanism for the primary screen box.

Referring to the drawings, and initially to FIG. 1 (prior art), a known split-deck screening device (A) for screening bulk material is shown. The device comprises a main sub-frame (B) mountable on a main frame (not shown), a primary screen box (C) comprising a plurality of vertically stacked screening decks (not shown) having a loading end (D1) to receive a supply of bulk material and an opposite discharge end (E1) to discharge non-screened material, a secondary screen box (F) mounted to the main sub-frame comprising a plurality of screening decks (not shown) having a loading end (D2) adjacent to the discharge end (E1) of the primary screen box and an opposite discharge end (E2) to discharge unscreened material, a primary screen box sub-frame (G) coupled to the main sub-frame having a discharge end (H) and a loading end (I), and a tilting mechanism (J) to tilt the primary screen box sub-frame relative to the main sub-frame downwardly towards the secondary screen box.

Figure 8:
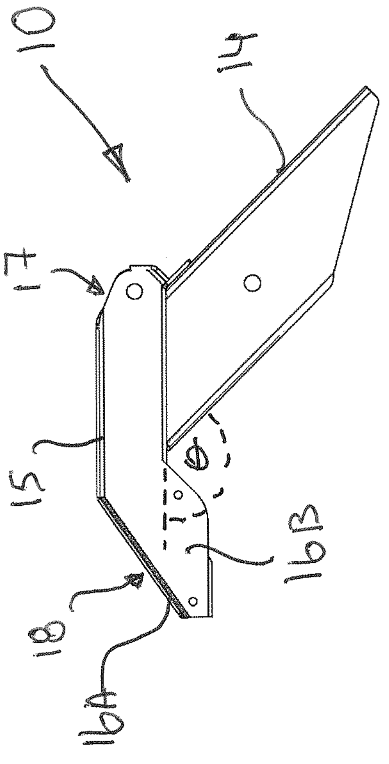
FIG. 8 is a side elevational view of a sub-frame carriage forming part of the split-deck screening device of the invention.
Figure 9A:
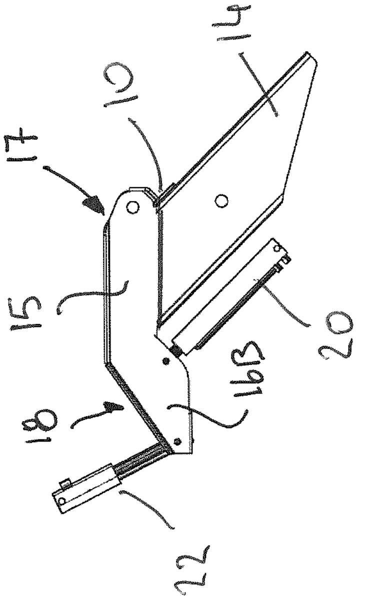
FIG. 9A is a side elevational view of the sub-frame carriage of Figure with first and second actuation rams attached and the first actuation ram retracted (operative position).
Figure 9B:
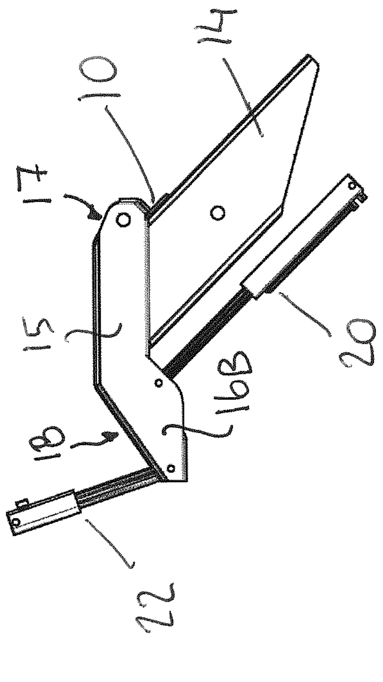
FIG. 9B is a side elevational view of the sub-frame carriage of FIG. 9A showing the first actuation ram extended (inoperative position).

Referring to FIGS. 2 to 7, the split-deck screening device of the invention is illustrated, and the maintenance of the screening device is illustrated in FIG. 8.

Referring to FIGS. 2 to 7, the splits-screen screening device of the invention (1) comprises a main sub-frame (2) mountable on a main frame (not shown), a primary screen box (3) comprising a plurality of screening decks (not shown) having a loading end (4A) to receive a supply of bulk material and an opposite discharge (5A) end to discharge non-screened material, and a secondary screen box (6) mounted to the main sub-frame (2) comprising a plurality of screening decks (not shown) having a loading end (4B) adjacent to the discharge end (5A) of the primary screen box and an opposite discharge end (not shown)) to discharge unscreened material. The primary screen box (3) is mounted on a primary screen box sub-frame (7) having a longitudinal side beams (8) connected by an end beam (9).

The primary and secondary screen boxes are substantially the same as those of the prior art and include vertically stacked screening decks (generally three or four) and supporting struts for the screening decks, and vibrational mechanisms for vibrating the screening decks to screen material and urge material along the decks from the loading end to the discharge end.

In the split-deck screening device of the invention, the primary box sub frame (7) is not directly attached to the main sub-frame (2) but is coupled thereto by means of two sub-frame carriages (10) disposed on each side of the device. Each sub-frame carriage (10) is pivotally attached to the primary screen box sub-frame (7) by a pivot joint (11) at a discharge end of the sub-frame (7) and slidably mounted to the main sub-frame (2) for movement from an operative position in which the discharge end (5A) of the primary screen box (3) is disposed adjacent to a receiving end of the secondary screen box (See FIGS. 2-5) to an inoperative position in which the primary screen box (3) is spaced above and away from the secondary screen box (6) to thereby provide access to one or more lower screening decks in the secondary screen box (See FIGS. 6 and 7).

The main sub-frame (2) comprises a guide for the primary screen box sub-frame disposed on each side of the primary screen box (3), the guide comprising two triangular spaced apart plates (12A, 12B) configured to receive and guide a section of the primary screen box sub-frame during movement between the operative and inoperative positions. The plates (12) include a series of corresponding holes (13) configured to receive mounting pins to support the primary screen box sub-frame in a raised position.

Referring specifically to FIG. 8, the sub-frame carriage (10) is provided by an elongated element that is cranked intermediate it's ends to provide a supporting leg (14) having a rectangular profile and an upper section (15) that in this embodiment is disposed at an angle Ø of about 135° to the supporting leg (14). The upper section (15) comprises a rear end (18) defined by two spaced-apart plates (16A, 16B) that in use receive an end of a longitudinal side beam (shown as 8 in FIG. 12) of the primary box sub-frame and has a front end (17) that in use is pivotally attached to an end of the longitudinal side beam (8). Referring to FIG. 6, each side of the main sub-frame includes a guiding sleeve (19) having a rectangular profile configured to receive the supporting leg (14) in a tight but sliding relationship. The guiding sleeve (19) is defined by a front wall (19A) and side walls (19B) and is disposed at an angle of about 45° to a longitudinal axis of the main sub-frame (2). It will be appreciated that different angles may be employed depending on the type of type of primary screen box and the number of decks, for example 20-60°, although for a three or four screen deck an angle of about 40-50° has been found to be ideal.

Referring to FIGS. 9 to 12, a first actuation means in the form of a hydraulic ram (20) is mounted between the main sub-frame (2) and rear end (18) of the upper section of each sub-frame carriage (10) and is used to move the sub-frame carriage (and primary screen box sub-frame/primary screen box) from the operative position shown in FIGS. 2-5 to the inoperative position shown in FIGS. 6 and 7. FIGS. 9A and 9B clearly illustrate the movement of the sub-frame carriage relative to the main sub-frame (not shown) when the actuation ram (20) is actuated. A second actuation means in the form of a hydraulic ram (22) is mounted between the primary screen box sub-frame (7) and the rear end (18) of the upper section of each sub-frame carriage (10), and is operable to tilt the primary screen deck is also provided and coupled between each sub-frame carriage and the primary screen box sub-frame and operable to tilt the primary screen box sub-frame relative to the sub-frame carriage.

Figure 10:
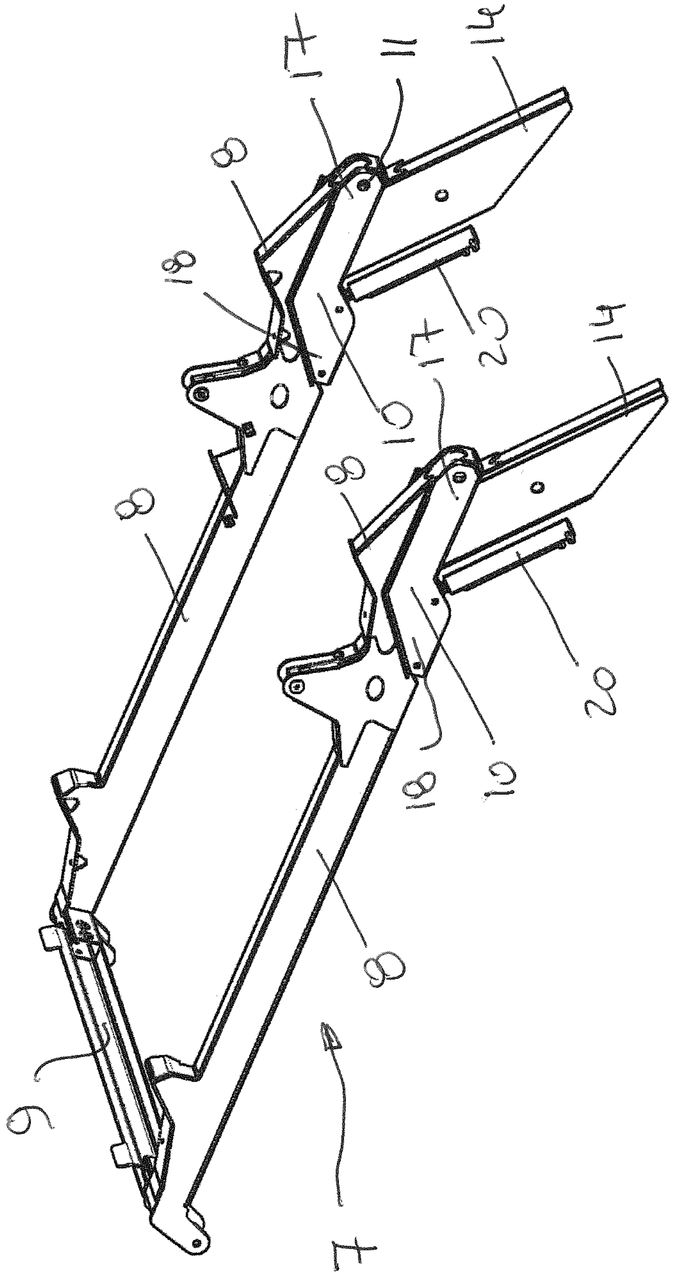
FIG. 10 is a perspective view of the primary screen box sub-frame attached at each side to a sub-frame carriage and showing the first actuation ram attached to the sub-frame carriage in a retracted (operative) position. The second actuation ram (hidden) is in retracted position which means that the primary screen box sub-frame is not tilted upwardly relative to the sub-frame carriage.
Figure 11:
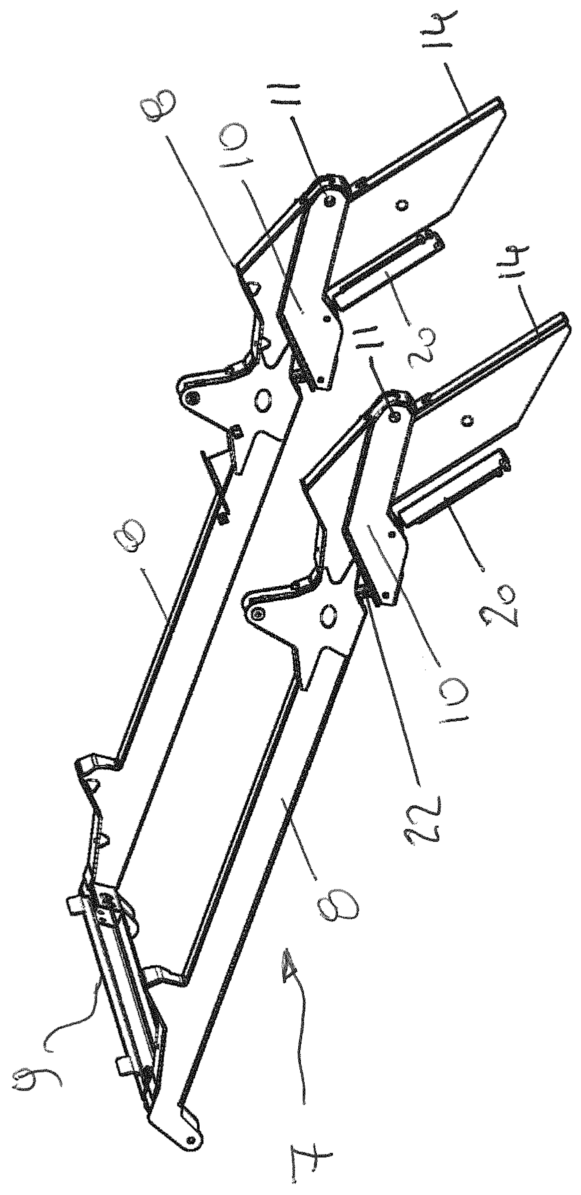
FIG. 11 is a perspective view similar to FIG. 10 but in which the second actuation rams (hidden) have been actuated to tilt the primary screen box sub-frame upwardly relative to the sub-frame carriage.
Figure 12:
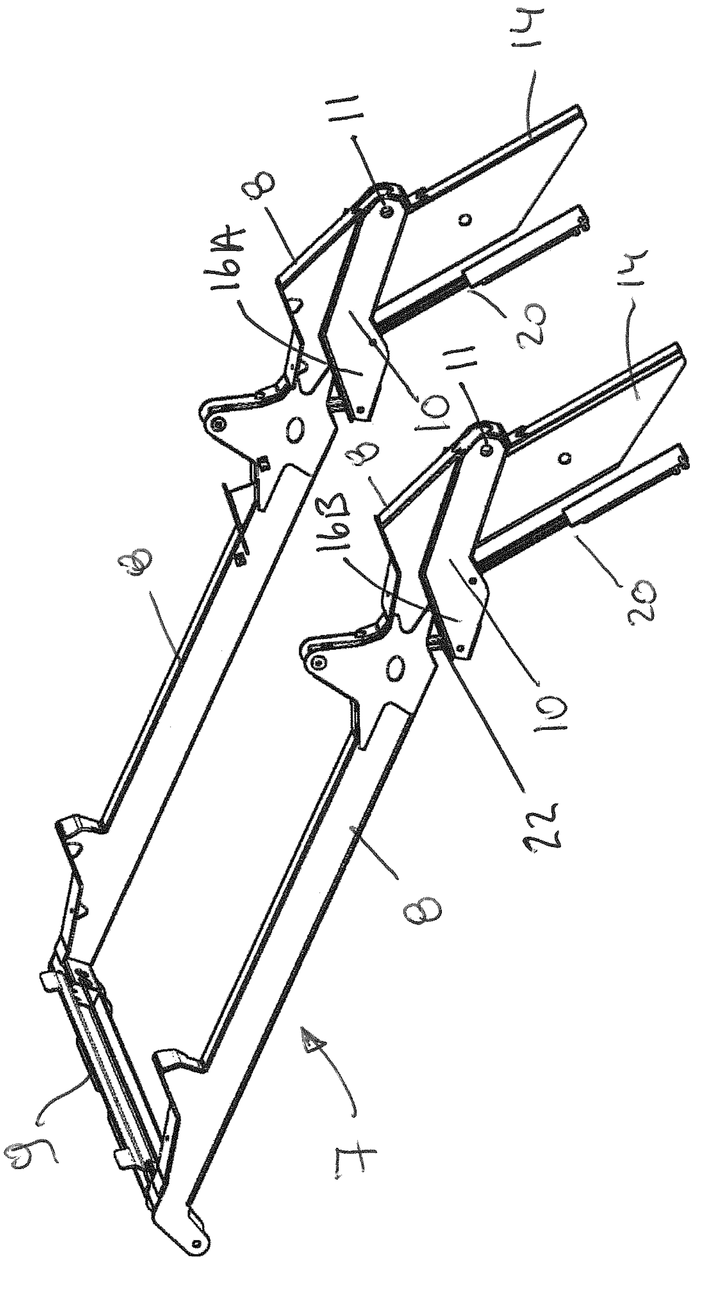
FIG. 12 is a perspective view similar to FIG. 11 but in which the first actuation rams have been actuated to move the primary screen box sub-frame up and away from the secondary screen box (not shown) while maintaining the angle of tilt of the primary screen box sub-frame.

FIGS. 10 to 12 illustrates the sub-frame carriages (10) attached to each side the primary screen box sub-frame (7) and the first actuation ram (20) the second actuation ram (hidden) attached to the carriage (10). In FIG. 11, the second actuation rams (22) have been actuated to tilt the primary screen box sub-frame (7) upwardly relative to the sub-frame carriages (10). In FIG. 12, the first actuation rams (20) have been actuated to move the carriage (10) up and away from the main frame while maintaining the angle of the primary screen box sub-frame (7) relative to the main frame.

Figure 13:
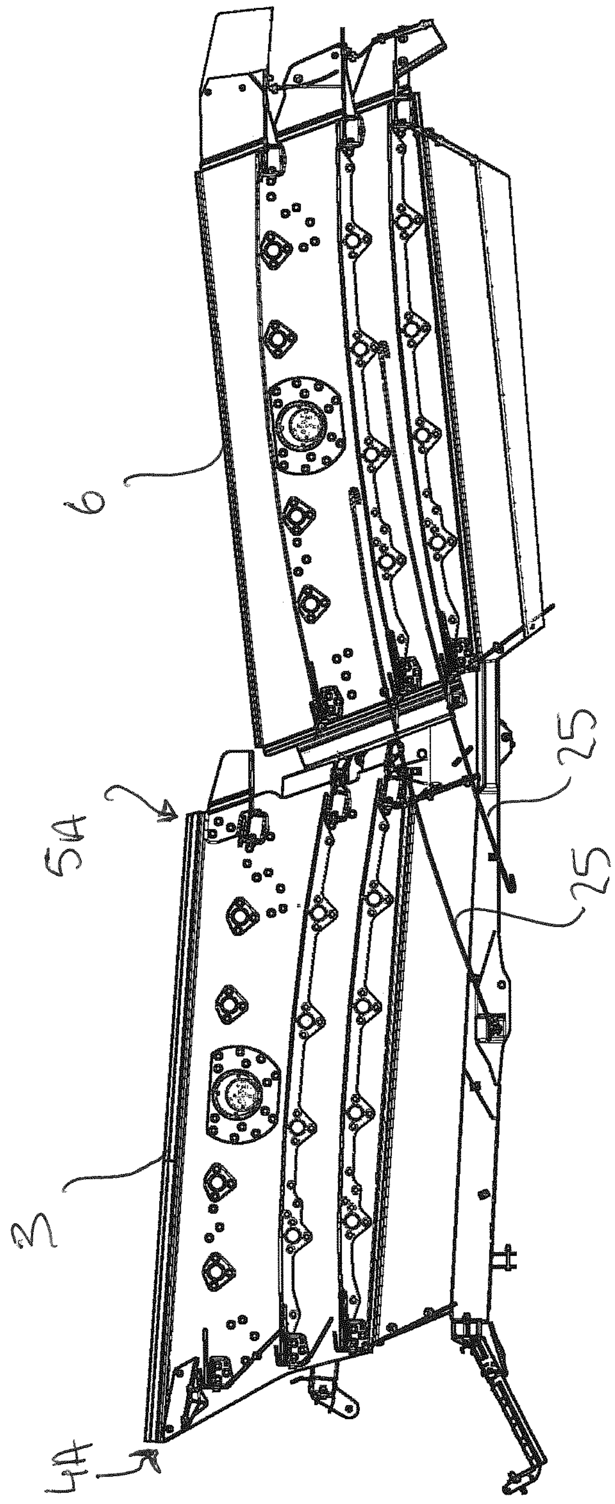
FIG. 13 is a side elevational view (shown from an opposite side of the device from FIG. 7) showing the primary screen box in the inoperative position and showing the removal of the lower screen decks from the secondary screen box to allow maintenance.

FIG. 13 illustrates the screening device of the invention in an inoperative position with the primary screen box (3) separated (moved up and away) from the secondary screen box (6) and showing the lower screening decks (25) being removed from the front end of the secondary screen box.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

The invention claimed is:

1. A split-deck screening device for screening bulk material comprising:

a main sub-frame;

a primary screen box including a plurality of screening decks having a loading end arranged to receive a supply of bulk material and an opposite discharge end arranged to discharge non-screened material;

a secondary screen box mounted to the main sub-frame including a plurality of screening decks having a loading end adjacent to the discharge end of the primary screen box and an opposite discharge end to discharge unscreened material;

a primary screen box sub-frame coupled to the main sub-frame having a discharge end and a loading end;

a sub-frame carriage arranged for coupling the primary screen box sub-frame to the main sub-frame attached at each side of the discharge end of the primary screen box sub-frame and actuatable to move the primary screen box from an operative position in which the discharge end of the primary screen box is disposed adjacent to a loading end of the secondary screen box to an inoperative position in which the primary screen box is spaced above and away from the secondary screen box to thereby provide access to one or more lower screening decks in the secondary screen box; and a first actuator arranged to actuate the sub-frame carriage, wherein each sub-frame carriage includes a supporting leg and an upper section disposed on top of the supporting leg, wherein the main sub-frame includes guide sections configured to receive each supporting leg in a sliding manner and guide the sliding movement of the sub-frame carriage between the operative and inoperative positions, and wherein each guide section of the main sub-frame defines a linear sliding path for the sub-frame carriage disposed at an angle of 30° to 60° to a longitudinal axis of the main sub-frame.

2. The split-deck screening device according to claim 1, wherein the sub-frame carriage is slidably mounted to the main sub-frame for angled movement from the operative position to the inoperative position, wherein the first actuator is coupled between the main sub-frame and each sub-frame carriage and operable to move the sub-frame carriages between the operative position and the inoperative position.

3. The split-deck screening device according to claim 1, wherein each sub-frame carriage is pivotally attached to the primary screen box sub-frame, wherein the device includes a second actuator coupled between each sub-frame carriage and the primary screen box sub-frame and operable to tilt the primary screen box sub-frame relative to the sub-frame carriage.

4. The split-deck screening device according to claim 3, wherein the first and second actuators are each, independently, hydraulic or pneumatic rams or electrical actuators.

5. The split-deck screening device according to claim 1, wherein the primary screen box and secondary screen box include at least two screening decks.

6. The split-deck screening device according to claim 1, wherein the upper section of each sub-frame carriage has a front section disposed above the supporting leg and a rear section, wherein the front section is pivotally attached to the discharge end of the primary screen box sub-frame, and the rear section is attached to an end of the first actuator.

7. The split-deck screening device as claimed in claim 1, wherein the upper section of each sub-frame carriage includes two spaced-apart upwardly depending plates, and wherein the discharge end of the primary screen box sub-frame is pivotally mounted to the upper section between the plates.

8. The split-deck screening device according to claim 1, wherein the main sub-frame includes a guide for the primary screen box sub-frame disposed on each side of the primary screen box, the guide including two spaced apart plates configured to receive and guide a section of the primary screen box sub-frame during movement between the operative and inoperative positions.

9. The split-deck screening device according to claim 8, wherein the spaced apart plates include a series of holes for receipt of a locking pin to lock the primary screen box sub-frame in one of a plurality of positions above the main sub-frame.

10. A method of maintaining a split-deck screening device according to claim 1, comprising the steps of actuating the first actuator to move the sub-frame carriage to the inoperative position in which the primary screen box is spaced above and away from the secondary screen box to thereby provide access to one or more lower screening decks in the secondary screen box; and accessing a rear of the secondary screen box or a front of the primary screen box to perform maintenance.

11. The method according to claim 10, wherein the maintenance includes removing one or more of the lower screening decks of the secondary screen box.

* * * * *